No. 782,403.

Patented February 14, 1905.

UNITED STATES PATENT OFFICE.

CLARENCE S. LOMAX, OF EVERETT, MASSACHUSETTS.

METHOD OF PURIFYING ILLUMINATING-GAS.

SPECIFICATION forming part of Letters Patent No. 782,403, dated February 14, 1905.

Application filed October 7, 1903. Serial No. 176,131.

*To all whom it may concern:*

Be it known that I, CLARENCE S. LOMAX, a citizen of the United States, residing at Everett, in the county of Middlesex and State of Massachusetts, have invented certain new and useful Improvements in Methods of Purifying Illuminating-Gas; and I do hereby declare the following to be a full, clear, and exact description of the invention, such as will enable others skilled in the art to which it appertains to make and use the same.

The present invention relates to an improved method of purifying illuminating-gas.

In the manufacture of illuminating-gas from coals containing a high percentage of sulfur a number of sulfur compounds are found to be present in the product which are objectionable in illuminating-gas by reason of the fact that when the gas is burned sulfur compounds are formed which not only have an offensive smell, but are positively harmful to animal and plant life. In many places it is required by law that all sulfureted hydrogen must be removed from the gas and that the amount of sulfur contained in other compounds remaining in the gas must be reduced to less than twenty grains per one hundred cubic feet. While the removal of sulfureted hydrogen is a comparatively inexpensive step in the purification of the gas, the removal of other sulfur compounds, of which six-sevenths to seven-eighths consist of carbon disulfid, has in the past been a highly expensive operation. The principal method heretofore employed for this purpose has been what is known as the "lime" method. In order to remove carbon disulfid by the lime method, it was first necessary to remove the carbonic acid from the gas, which was performed by passing the gas through hydrated lime. The gas was then passed through sulfided lime, which absorbed carbon disulfid to a greater or less extent, depending upon the rapidity with which the gas passed through the absorbing material and the amount of surface exposed. Thereafter the sulfureted hydrogen was removed by passing the gas through an "iron sponge" of ferric hydroxid or similar absorbent. The objections to this method not only involve the very considerable expense incident thereto, but the intensely disgusting and widely-disseminated odor of the spent lime, the wear and tear on the purifying plant, and the labor involved in the removal and replacement of the lime.

In the removal of the carbon disulfid—that is, the principal organic sulfur compound—from illuminating-gas it has been proposed to make use of the reaction between carbon disulfid and amins by employing an amin, such as anilin, dissolved in alcohol or oil as a washing material for washing the gas. The employment of this method of washing carbon disulfid from illuminating-gas even if it were used in connection with powdered sulfur as a catalytic or contact substance, as has also been suggested, would necessarily involve elaborate and expensive scrubbers for the reaction, which would not only absorb illuminants from the gas, and therefore necessitate further carbureting of the gas for the restoration of the lost illuminants, but the size of the scrubbers would have to be so great in order to afford sufficient contact between the gas and the reagents as to make the apparatus required very large and costly. This method would also involve considerable expense for attendance and motive power. Moreover, it is to be observed that the powdered sulfur would afford a relatively small contact-surface by reason of the fact that with relation to the surfaces exposed and capable of affording reaction the area of the sulfur particles would be small. This would reduce the speed of the reaction. Furthermore, it would be necessary to install and maintain purifying plants and pumps for clarifying the exhausted solutions from the scrubbers by removing the sulfo-carb anilid deposited in the solutions, as well as to maintain stills and furnaces for the redistillation of the solvent oils in order to revivify them for further use. This method, as far as known to the present applicant, has never been successfully used on a commercial scale, owing to the objections of the enormous expense incident to the installation and maintenance of the plant.

The object of the present invention is to produce an improved method of purifying illuminating-gas. It contemplates the removal of carbon disulfid in a cheap and economical manner, preferably with existing apparatus and with the aid of inexpensive materials. According to the present invention the reaction between carbon disulfid and amins is availed of to remove the carbon disulfid from the illuminating-gas, and perhaps the most important feature of the present invention is the discovery by me that this reaction may be carried on on a commercial scale by chemically-divided sulfur as the catalytic or contact substance.

The present method of purifying illuminating-gas consists in the removal of carbon disulfid by the use of the carbon disulfid and amin reaction in the presence of chemically-divided sulfur. The gas from the generators or retorts after having been cooled and scrubbed free of its contents of tar and ammonia is passed through a purifying-box, such as is ordinarily used in the gas-works, which contains chemically-divided sulfur impregnated with an amin. The preferred form in which the sulfur is used is in the iron sponge which is used for removing sulfureted hydrogen from gas. It is to be remarked that the invention also contemplates the use of bog-iron ore, weldon mud, Lux's mass, Laming's mass, spent lime, or the mixtures of these materials with wood shavings, sawdust, coke, braise, and other materials used for increasing the porosity of the material, which materials have been commonly used for the removal of sulfureted hydrogen from gas and are therefore after use rich in free chemically-divided sulfur. As is well known, the removal of sulfureted hydrogen from gas is accomplished by the use of ferric hydroxid in a purifying-box through which the gas is passed. The ferric hydroxid reacts with the sulfureted hydrogen to form iron sulfid and water. This sulfid of iron is revivified for repeated use by oxidation by exposure to the air or oxygen, which transforms the sulfid into free chemically-divided sulfur and ferric oxid or hydroxid. The iron sponge is used over and over again with revivifications between until it is useless for further removal of sulfureted hydrogen, and at this time this material, known as "spent oxid," is heavily charged with very finely-divided free sulfur, which exists in a chemically-divided state, as much as forty to sixty per cent. of the spent oxid being free sulfur. By reason of the fact that this spent oxid is composed so largely of sulfur and the sulfur is in such a finely-divided state it exposes an enormous surface of sulfur and is the best catalytic substance for use in the present method of which the applicant is aware. Of course it is to be understood that the present invention is not limited to the use of spent oxid as the catalytic or contact substance of the reaction; but the invention contemplates in its broader aspects any form of chemically-divided sulfur which the user may desire to employ. The purifying-box, therefore, is preferably filled with the spent oxid, which is impregnated with an amin or amins, preferably commercial anilin, which in the presence of the sulfur reacts vigorously with the carbon disulfid contained in the gas passing through it to form sulfo-carb anilid and sulfureted hydrogen, the reaction being as follows:

$$2C_6H_5NH_2 + CS_2 + S = CS(C_6H_5NH)_2 + H_2S + S.$$

It is to be noted that the sulfur which is included in the reaction enters only as a catalytic or contact substance and is not affected by the reaction which it promotes. If desired, the anilin used for impregnating the spent oxid may be mixed with a suitable neutral solvent or diluent in order to form a vehicle for spreading the same over the surface of the sulfur. When this purifier containing spent oxid and anilin has been used until the anilin is exhausted by the reaction, the purifying-box is put out of operation and the exhausted material replaced with spent oxid freshly impregnated with anilin. The material is deprived by the reaction of its anilin only, and in order to prepare it for further use it is only necessary to again impregnate it with the anilin solution, when it is ready for further use. The same spent oxid may be used many times. After the gas has been deprived of its carbon disulfid in the purifying-box in the manner just referred to it is passed through an ordinary purifying box or boxes containing ferric hydroxid or other material for the removal of sulfureted hydrogen, after which the gas may be conveyed to the meters and gas-holders.

It will be observed that the present method renders unnecessary the removal of the carbonic acid from the gas, eliminating an expensive step which is necessary in the lime method for the removal of carbon disulfid. The reaction of the carbon disulfid with the anilin in the presence of such a great sulfur surface is so vigorous and rapid that in practice it will be necessary in order to reduce the amount of organic sulfur compounds in the gas below the permissible or hygienic limit to pass only part of the gas through the sulfur-anilin purifying-box, the remainder of the gas being permitted to pass by and be mixed with the gas from the sulfur-anilin purifying-box, which mixture shall contain only the permissible amount of sulfur in compounds other than sulfureted hydrogen. This is a feature of the present invention of considerable practical value, as it materially diminishes the volume of gas necessary to be treated by the process and at the same time produces a product sufficiently free from organic sulfur compounds.

This process as preferably carried on is a dry process and not a wet process. This is an important feature of the invention and commends it over prior attempts to employ the amin reaction by reason of the elimination of specially-designed and expensive scrubbers for washing the gas and recarbureting of the gas for the restoration of lost illuminants, as hereinbefore suggested, and by reason of other attendant advantages apparent to those skilled in the art.

Having thus described the invention, what is claimed is—

1. The method of purifying illuminating-gas, which consists in exposing it to an amin or amins in the presence of metallic oxids impregnated with chemically-divided sulfur, substantially as described.

2. The method of purifying illuminating-gas, which consists in exposing it to anilin in the presence of metallic oxids impregnated with chemically-divided sulfur, substantially as described.

3. The method of purifying illuminating-gas, which consists in exposing it to anilin mixed with a diluent in the presence of metallic oxids impregnated with chemically-divided sulfur, substantially as described.

4. The dry process of purifying illuminating-gas, which consists in exposing it to the action of an amin or amins spread over the surface of chemically-divided sulfur, substantially as described.

5. The dry process of purifying illuminating-gas, which consists in exposing it to an amin or amins spread over the surface of metallic oxids impregnated with chemically-divided sulfur, substantially as described.

6. The dry process of purifying illuminating-gas, which consists in exposing it to the action of anilin spread over the surface of a spongy mass of chemically-divided sulfur, substantially as described.

In testimony whereof I affix my signature in presence of two witnesses.

CLARENCE S. LOMAX.

Witnesses:
HORACE VAN EVEREN,
ALFRED H. HILDRETH.